(12) United States Patent
Edwards et al.

(10) Patent No.: US 6,184,286 B1
(45) Date of Patent: Feb. 6, 2001

(54) FILLER-REINFORCED ENGINEERING THERMOPLASTIC POLYURETHANE DISPERSION IN A THERMOPLASTIC RESIN

(75) Inventors: Christopher Michael Edwards, Midland, MI (US); Paul J. Moses, Lake Jackson, TX (US); Roger Clement, Midland, MI (US)

(73) Assignee: The Dow Chemical Company, Midland, MI (US)

( * ) Notice: Under 35 U.S.C. 154(b), the term of this patent shall be extended for 0 days.

(21) Appl. No.: 09/382,019

(22) Filed: Aug. 24, 1999

Related U.S. Application Data

(60) Provisional application No. 60/099,743, filed on Sep. 10, 1998.

(51) Int. Cl.[7] .............................. C08J 3/00; C08K 3/20; C08K 9/00; C08K 9/06; C08L 75/00
(52) U.S. Cl. .......................... 524/507; 523/200; 523/205; 523/206; 523/214; 523/215; 523/216; 523/217; 523/221; 524/539; 524/589; 524/590
(58) Field of Search ..................... 524/507, 539, 524/589, 590; 523/200, 205, 206, 214, 215, 216, 217, 221

(56) References Cited

U.S. PATENT DOCUMENTS

| | | |
|---|---|---|
| 4,385,133 | 5/1983 | Alberino et al. . |
| 4,474,906 | 10/1984 | Nakama et al. ................. 523/205 |
| 4,522,975 | 6/1985 | O'Connor et al. . |
| 5,017,629 | 5/1991 | Wilson et al. ................. 523/219 |
| 5,167,899 | 12/1992 | Jezic . |

*Primary Examiner*—Patrick D. Niland
(74) *Attorney, Agent, or Firm*—Reid S. Willis

(57) ABSTRACT

Physical properties of polymer resins, particularly amorphous resins such as ABS or SAN copolymers, are markedly improved by dispersing therein a filler-reinforced engineering thermoplastic polyurethane.

9 Claims, No Drawings

US 6,184,286 B1

FILLER-REINFORCED ENGINEERING THERMOPLASTIC POLYURETHANE DISPERSION IN A THERMOPLASTIC RESIN

This application claims the benefit of U.S. Provisional Application Ser. No. 60/099,743, filed Sep. 10, 1998.

BACKGROUND OF THE INVENTION

This invention relates to a composition that comprises a dispersion of a filler-reinforced engineering thermoplastic polyurethane in a thermoplastic resin.

It is well known that the physical properties of thermoplastics can be improved by incorporation of filler materials such as glass fibers. However, dispersing glass fibers into an amorphous resin is difficult because amorphous resins tends to have high melt-phase viscosities. Moreover, dispersing glass filled composites in a resin where the composite matrix is an amorphous resin is also difficult since the high melt-phase viscosity prevents effective dispersion of the glass fibers. Where the composite matrix is crystalline, dispersion is less difficult; however, crystalline resins are seldom compatible with amorphous resins.

It would therefore be desirable to find an efficient and effective means of dispersing a filler material into an amorphous thermoplastic resin.

SUMMARY OF THE INVENTION

The present invention addresses the deficiencies of the art by providing a composition comprising a dispersion of a filler-reinforced engineering thermoplastic polyurethane in an amorphous or a crystalline polymer resin. The ability of the engineering thermoplastic polyurethane (ETPU) to depolymerize at high temperatures and repolymerize upon cooling gives the ETPU an exceptionally low melt-phase viscosity at the processing temperature, and provides a carrier that is compatible with the target resin, thereby allowing for the efficient dispersion of the filler material in a polymer matrix.

DETAILED DESCRIPTION OF THE INVENTION

The ETPU that is used to make the dispersion of the present invention is characterized by containing a hard segment which contains structural units formed from the reaction of a diisocyanate with a diol chain extender having a molecular weight not more than 300. Suitable diisocyanates are well know in the art and include aromatic, aliphatic, and cycloaliphatic diisocyanates and combinations thereof. Representative examples of these preferred diisocyanates can be found in U.S. Pat. Nos. 4,385,133; 4,522,975; and 5,167,899, the disclosure of which diisocyanates are incorporated herein by reference. Preferred diisocyanates include 4,4'-diisocyanatodiphenylmethane, p-phenylene diisocyanate, 1,3-bis(isocyanatomethyl)-cyclohexane, 1,4-diisocyanatocyclohexane, hexamethylene diisocyanate, 1,5-naphthalene diisocyanate, 3,3'-dimethyl-4,4'-biphenyl diisocyanate, 4,4'-diisocyanatodicyclohexylmethane, and 2,4-toluene diisocyanate, or mixtures thereof. More preferred are 4,4'-diisocyanato-dicyclohexylmethane and 4,4'-diisocyanatodiphenylmethane. Most preferred is 4,4'-diisocyanatodiphenylmethane.

Suitable diol chain extenders are also well known in the art and include ethylene glycol, 1,3-propanediol 1,4-butanediol, 1,5-pentanediol 1,6-hexanediol, diethylene glycol, triethylene glycol, tetraethylene glycol, neopental glycol, 1,4-cyclohexanedimethanol, 1,4-bishydroxyethylhydroquinone, and mixtures thereof. More preferred diol chain extenders are 1,4-butanediol, 1,6-hexanediol a mixture of 1,4-butanediol and diethylene glycol, mixture of 1,4-butanediol and triethylene glycol, a mixture of 1,4-butanediol and tetraethylene glycol, and 1,4cyclohexanedimethanol.

The hard segment constitutes preferably from at least 75 weight percent, more preferably from at least 90 weight percent, to about 100 weight percent of the ETPU.

The ETPU has a $T_g$ of greater than 50° C. and may optionally include a soft segment, that is, units formed from the reaction of a diisocyanate and a high molecular weight glycol having a molecular weight in the range of not less than 750, more preferably not less than 1000, and most preferably not less than 1500, and preferably not greater than about 8000, more preferably not greater than 6000, and most preferably not greater than 5000.

Preferably the soft segment constitutes not more than 25, more preferably not more than 10 weight percent of the ETPU. Suitable examples of high molecular weight diols include polyester polyols or polyether polyols such as those well known in the art.

The filler material can be inorganic or organic, and preferably inorganic. Examples of inorganic filler material include fibers of glass, carbon, aramid, silica, silica-alumina, zirconia, boron nitride, and silicon nitride, with glass fibers, particularly long glass fibers, being preferred. The concentration of the filer material in the ETPU is not critical so long as there is sufficient ETPU to coat or wet the filler material; preferably the concentration is not less than 40, more preferably not less than 50 weight percent based on the ETPU and filler material, and preferably not greater than 90, more preferably not greater than 70 weight percent. Examples of commercially available long glass fiber-reinforced ETPUs include ISOPLAST 101LGF60 and ISOPLAST 202LGF60 engineering thermoplastic polyurethanes (60 percent long glass fiber-reinforced ISOPLAST 101 and 202 resins respectively, available from Dow Chemical).

The matrix resin in which the filled ETPU is dispersed may vary widely. Although a crystalline resin may be used as a matrix resin, the greatest advantages are observed for an amorphous resin, since the greater challenge is in dispersing filler in this kind of resin. Examples of amorphous matrix resins include, but are not restricted to, an acrylonitrile-butadiene-styrene copolymer (ABS), a styrene-acrylonitrile copolymer (SAN), a glycol-modified polyethylene terephthalate (PETG), a polyphenylene oxide (PPO), and a glycol-modified polycyclohexanedimethanol terephthalate. Examples of crystalline resins include, but are not restricted to, polyethylene terephthalate (PET), polybutylene terephthalate (PBT), and polycyclohexanedimethanol terephthalate. The optimal concentration of filler reinforced ETPU in the matrix resin is often determined by economics and the final physical property requirements; in general, the concentration is preferably not less than about 5, more preferably not less than about 10 weight percent based on the total weight of the filler reinforced ETPU and the matrix resin, and not more than 80, more preferably not more than 50, and most preferably not more than 25 weight percent. One of the advantages of the composition of the present invention is the ease by which the concentration of the filler reinforced ETPU can be adjusted; this feature provides a facile way of fine tuning physical properties.

It has been discovered that properties such as DTUL, flexural strength, flexural modulus, tensile strength, tensile modulus, and mold shrinkage are all improved significantly for a resin, particularly an amorphous resin, containing the reinforced ETPU as compared to the resin that does not contain the reinforced ETPU. Though not bound by theory, it is believed that the reason for the marked improvement is that the filler is protected by the ETPU, even during processing where depolymerization occurs, so that the reinforcing filler material doesn't come into significant contact with the matrix resin. Thus, it is as though the ETPU, and not the reinforcing filler material, is being dispersed in the matrix resin. Moreover, when the filler material contain isocyanate reactive groups such as hydroxyl groups or amine groups, filler material can chemically bind to the repolymerizing ETPU, thus providing even further enhancement of dispersion.

The present invention provides a composite material that is useful in office furniture, luggage, automotive applications such as indicator stalks and wing mirror housings, and sports equipment such as in-line skate frames.

The following examples are for illustrative purposes only and are not intended to limit the scope of this invention.

EXAMPLE 1

Long Glass Reinforced ETPU in an SAN Resin

A commercial SAN resin (TYRIL 880 resin, 90 parts by weight, Dow Chemical) was blended with a long glass reinforced ETPU (60 percent long glass filled ISOPLAST 101 resin, 10 parts by weight, Dow Chemical) after each resin was dried overnight in a desiccant bed drier with a −40° C. dew point, and at a temperature of 82° C. (180° F.). The materials were tumbled together just prior to injection molding on a 28-ton Arburg Injection Molding Machine. Parts were molded using standard injection molding conditions and tested to give the performance shown in Table 1. The physical properties of the SAN is shown without reinforcement for comparison.

TABLE 1

| Property | SAN w/10% gf-ETPU | SAN |
| --- | --- | --- |
| DTUL at 0.46 Mpa, ° C. | 104 | 99 |
| DTUL at 1.8 Mpa, ° C. | 99 | 88 |
| Flexural Strength, Mpa | 140 | 140 |
| Flexural Modulus, Mpa | 5200 | 2100 |
| Tensile Strength, Mpa | 85 | 83 |
| Tensile Modulus, Mpa | 5000 | 3900 |
| Mold Shrinkage (%) | 0.28 | 0.44 |

EXAMPLE 2

Long Glass Fiber Reinforced ETPU in an ABS Resin

ABS/long-glass filled ETPU blends were prepared using ABS 342 EZ resin (80 weight percent, Dow Chemical) and ISOPLAST 101LGF60 resin (20 weight percent, Dow Chemical). The samples were dried, tumble blended, and injection molded as described in Example 1. The performance properties of the reinforced ABS compared to the unreinforced ABS are shown in Table 2.

TABLE 2

| Property | ABS w/20% gf-ETPU | ABS |
| --- | --- | --- |
| DTUL at 0.46 Mpa, ° C. | 101 | 89 |
| DTUL at 1.8 Mpa, ° C. | 93 | 60 |
| Flexural Strength, Mpa | 115 | 68 |
| Flexural Modulus, Mpa | 3900 | 2400 |
| Tensile Strength, Mpa | 70 | 34 |
| Tensile Modulus, Mpa | 4100 | 2000 |
| Mold Shrinkage (%) | 0.21 | 0..67 |

What is claimed is:

1. A composition comprising a dispersion of a filler-reinforced engineering thermoplastic polyurethane in an amorphous or a crystalline polymer resin wherein the engineering thermoplastic polyurethane is characterized by having a $T_g$ of greater than 50° C.

2. The composition of claim 1 wherein the polymer resin is amorphous.

3. The composition of claim 2 wherein the amorphous polymer resin is an acrylonitrile-butadiene-styrene copolymer, a styrene-acrylonitrile copolymer, a polyphenylene oxide, a glycol-modified polyethylene terephthalate, or a glycol-modified polycyclohexanedimethanol terephthalate.

4. The composition of claim 2 which contains not less than 5 and not more than 50 weight percent of the filler-reinforced engineering thermoplastic polyurethane, wherein the filler includes long glass fibers.

5. The composition of claim 4 wherein the amorphous polymer resin is an acrylonitrile-butadiene-styrene copolymer or a styrene-acrylonitrile copolymer.

6. The composition of claim 5 wherein the engineering thermoplastic polyurethane contains a hard segment that constitutes at least 90 weight percent of the engineering thermoplastic polyurethane.

7. The composition of claim 6 wherein the polymer resin is crystalline.

8. The composition of claim 7 wherein the crystalline polymer resin is a polyethylene terephthalate, a polybutylene terephthalate, or a polycyclohexanedimethanol terephthalate.

9. A composition comprising a dispersion of a filler-reinforced engineering thermoplastic polyurethane in an amorphous or crystalline polymer resin wherein the engineering thermoplastic polyurethane is characterized by having: a) a $T_g$ of greater than 50° C.; and b) a hard segment that constitutes about 100 percent by weight of the engineering thermoplastic polyurethane.

* * * * *